United States Patent [19]

Greene

[11] 4,129,921

[45] Dec. 19, 1978

[54] PLASTIC GRIP RING

[75] Inventor: Frederick C. Greene, St. Joseph, Mich.

[73] Assignee: Shepherd Products U.S. Inc., St. Joseph, Mich.

[21] Appl. No.: 867,138

[22] Filed: Jan. 5, 1978

[51] Int. Cl.² .......................................... B60B 33/00
[52] U.S. Cl. .................................................... 16/38
[58] Field of Search ...................... 16/38, 18 R, 29, 37

[56] References Cited

U.S. PATENT DOCUMENTS

| 1,929,743 | 10/1933 | Jarvis et al. | 16/38 |
| 2,294,807 | 9/1942 | Schultz, Jr. | 16/38 X |
| 2,847,697 | 8/1958 | Kramcsak, Jr. | 16/38 |
| 3,000,042 | 9/1961 | Reynolds | 16/38 X |
| 3,076,221 | 2/1963 | Reynolds | 16/38 X |
| 3,197,802 | 8/1965 | Fontana et al. | 16/38 X |

Primary Examiner—Werner H. Schroeder
Assistant Examiner—Moshe I. Cohen
Attorney, Agent, or Firm—McWilliams & Mann

[57] ABSTRACT

A plastic grip ring for a caster assembly comprising a ring shaped member having a tapered outer perimeter with an interior surface including a cylindrical collar portion, a larger diameter cylindrical bottom portion merging with the collar portion by an arcuate, tapered connecting portion and a notched area extending vertically of the interior surface wherein the bottom portion and the notched area provide means for mounting the ring over the head of a caster stem.

6 Claims, 6 Drawing Figures

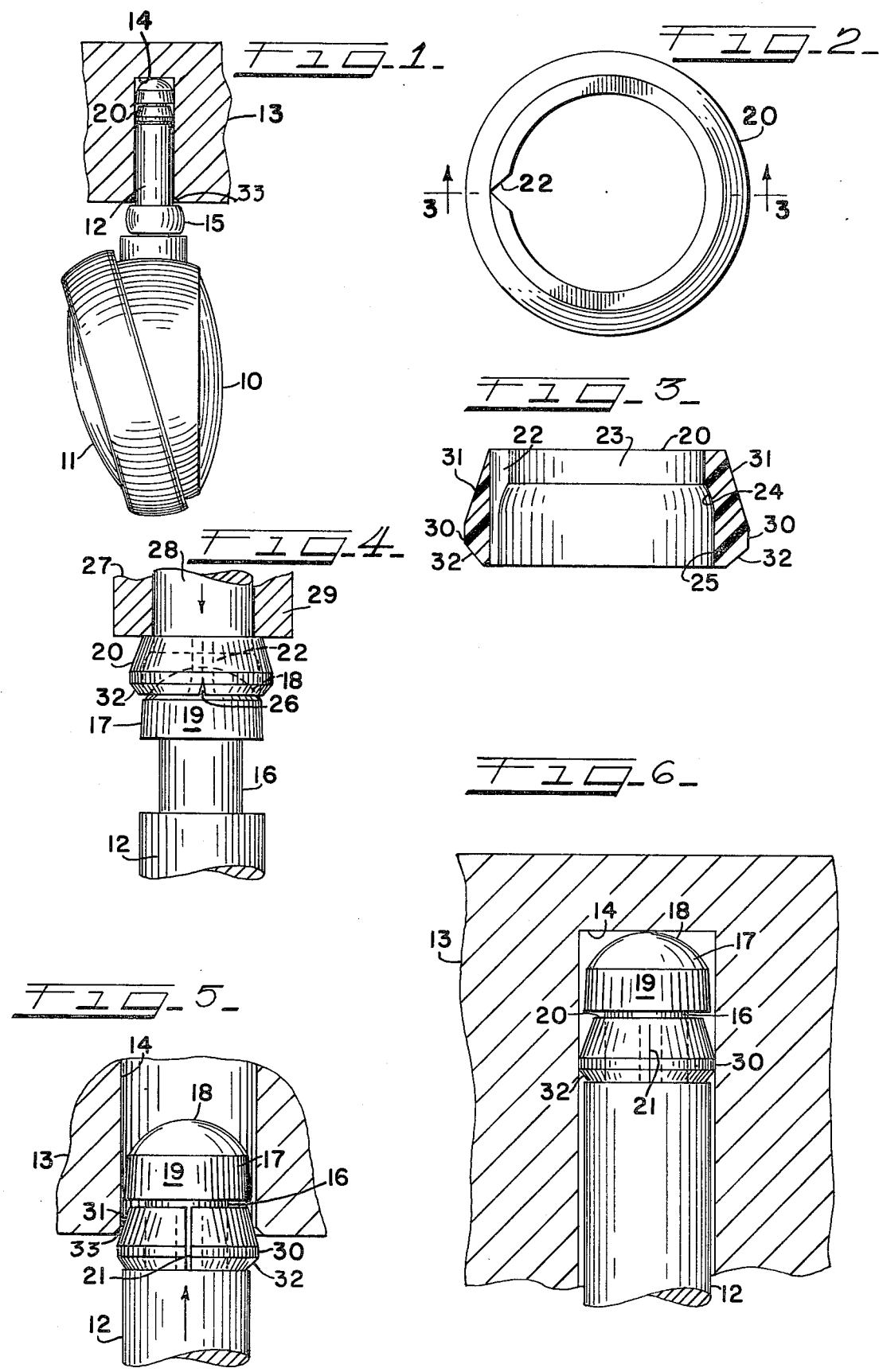

PLASTIC GRIP RING

BACKGROUND OF THE INVENTION

Heretofore, attachment rings, or securing devices have been provided on caster stem assemblies but these devices invariably have been made of metal, sometimes steel, but also brass, or copper. These metal inserts between a caster stem and a mounting socket, over a normal period of use, formed corrosion in the assembly and made removal of the stem very difficult. Also, the metal devices frequently would take a permanent set and as a consequence were rendered useless for repeated installations. In some mountings a groove has been formed on the stem and a locking pin was passed through the groove into the mounting to hold the stem in place.

Other mounting arrangements included grooves both on the stem and in the mounting and a metal ring was mounted in the groove on the stem and engaged into the groove in the mounting. Many such mounting arrangements necessitated machining operations on the stem and frequently in the mounting as well. The problems of mounting a caster stem in metal furniture, or the like, are more difficult than where the mounting is made in wood furniture. Metal structures, of course, are more rigid and sometimes lubrication has been restored to in making a caster installation which was undesirable to the ultimate user.

With the metal inserts between the caster stem and a metal mounting socket it was necessary that the entering opening of the socket be chamfered for assembly of the stem and metal device into the socket. Otherwise, entry of the stem assembly into the mounting hole became extremely difficult and necessitated special tools to compress the metal insert device.

SUMMARY OF THE INVENTION

This invention relates to a mounting for a caster and is concerned with providing a non-corrosive securement of the stem of such a caster in a mounting socket. To this end the invention consists of a non-metallic insert on the caster stem in the form of a resilient ring molded from a plastic resin and which is mounted in an annular recess extending around the stem at a position adjoining the head of the stem at one end thereof. The plastic ring by its sectional shape acts somewhat as an annular spring between the stem and the mounting socket and the outer face of the ring frictionally engages the interior surface of the mounting socket to hold the stem in place while the interior surfaces of the ring grip the recessed portions of the caster stem to provide a secure retention of the caster assembly in its mounting. The cross sectional contours of the grip ring are such that the ring may readily be applied on the caster stem and the assembled ring and stem may readily be inserted into the mounting socket.

This cross sectional shape of the plastic ring is generally bell-shaped and includes an inner cylindrical collar adapted to fit around the stem in the annular recess and an outer tapered surface which flares downwardly from the top of the ring, which is of smallest diameter, to a cylindrical outer bearing surface of maximum diameter, which frictionally engages the inner surface of the mounting socket. From the outer bearing surface the ring is chamfered, or beveled inwardly to the bottom edge of the ring. The lower ring portion incorporates a bottom opening of larger diameter than the inside diameter of the cylindrical collar at the top and the walls of this opening are cylindrical and extend vertically and then merge with the inner walls of the cylindrical collar through ararcuate upwardly tapering portion that provides the bell-like shape and facilitates mounting of the ring over the head of the caster stem. An important feature of the plastic ring structure is the provision of a vertically extending notch in the interior surface of the ring which defines a breaker area where the ring splits when it is placed over the head of the stem to provide a split ring installation which may readily be applied on the stem and just as readily removed.

The bell-shaped cross sectional shape of the ring is such that the ring may be compressed during insertion of the assembly into a mounting socket and the plastic material of the ring is such that it does not take a permanent set due to such compression but is spring like and springs back to normal when the stem is withdrawn from the mounting socket and may be reinserted without losing any of its desirable qualities. The shape and extent of the notch, both vertically and with respect to its depth, is such that a clean break occurs when the ring is passed over the head of the caster stem.

The bell-shaped interior of the grip ring facilitates its mounting over the head of the stem and the outer tapered surface facilitates entry of the assembled stem and grip ring into the mounting socket. The grip ring by its shape is easier to enter into the mounting socket without the necessity for chamfering the entering opening to any great extent as formerly. By providing an integral notch in the ring the grip ring lends itself to automatic assembly onto the stem and also enables manufacturing tolerances to be held to a minimum and the break area defined by the notch also enables the dimensions of the grip ring to be held closer to desired size. With this grip ring of integral non-metallic structure it is not necessary to resort to any secondary crimping operation to mount the ring on the caster stem or to arrive at the desired dimension, as might be necessary with metal devices.

OBJECTS OF THE INVENTION

The invention relates primarily to a non-metallic grip ring for a caster assembly made from a plastic resin material to provide a non-corrosive member for retaining a caster mounting stem in a socket.

The principal object of the invention is to provide a plastic grip ring for a caster assembly having internal and external contours which facilitate mounting of the ring onto a caster stem and the mounting of the assembled ring and stem into a mounting socket, or hole.

An important object of the invention is the provision of a plastic grip ring having an external tapered contour, an internal cylindrical collar, a bottom cylindrical portion of larger diameter merging with the collar by a bell shaped area and a notched break area in the internal surface of the ring.

A further object of the invention is to provide a plastic grip ring for the stem of a caster having a bell mouthed bottom opening with an internal tapering contour for mounting over the head of a caster stem with a notch in the internal surface to provide a split ring mounted on the stem and having an external tapered surface for insertion of the stem and ring into a mounting socket.

Another object of the invention is the provision of a plastic grip ring for a caster stem in a mounting socket, or hole having internal contours affording a resilient spring action enabling compression of the grip ring in the socket, or hole.

Still another object of the invention is to provide a plastic grip ring adapted to fit into an annular recess on a caster stem over the head of the stem and having an internal notch which provides a split ring upon fitting over the head and contracted into the recess beneath the head.

A still further object of the invention is the provision of a plastic grip ring for a caster stem which is molded from a plastic resin and having cross sectional contours which conform to the stem and provide for fitting the ring over the head of the stem and for fitting the stem and ring into a mounting socket, or hole while affording a split ring having a resilient spring action.

DESCRIPTION OF THE DRAWINGS

The foregoing and other and more specific objects of the invention are attained by the construction and arrangement illustrated in the accompanying drawings, wherein FIG. 1 is a general view of a caster secured in a metal mounting structure utilizing the plastic grip ring of this invention;

FIG. 2 is a detail plan view of the plastic grip ring showing the notch for forming the split in the ring during application;

FIG. 3 is a cross sectional view through the grip ring taken on the line 3—3 FIG. 2;

FIG. 4 is a detail view showing the application of the grip ring over the head of a caster stem which splits the plastic ring for subsequent retraction into the annular recess beneath the head of the stem;

FIG. 5 also is a detail view showing the split plastic grip ring mounted in the recess of the caster stem and in position to be entered into the metal mounting structure with the upwardly tapered surface in engagement with the opening into the mounting structure; and FIG. 6 is a detail sectional view of the caster stem and assembled grip ring entered fully into the receiving socket, or hole, of the mounting structure.

DESCRIPTION OF PREFERRED EMBODIMENT

In the drawings a caster assembly is best shown in FIG. 1 as including a body 10 with a relatively rotatable wheel member 11 and a vertical stem 12 mounted in the body structure to project upwardly therefrom for entry into a mounting structure to be supported by the caster. The mounting structure 13 is disclosed as being of metal having a mounting socket 14 for receiving the caster stem 12 but the caster mounting of this invention may be used also with other structures to be supported such as wood furniture where a metal socket for receiving the stem 12 might be utilized. The stem 12 includes a collar 15 (see FIG. 1) which defines both the extent of the stems entry into the mounting socket 14 and the entry of the opposite end of the stem into the caster body 10 as well.

The caster stem 12 has an annular recess 16 immediately beneath a head 17 at its end which enters the mounting socket 14. The head 17 has a rounded top portion 18 and cylindrical side wall portions 19. The annular recess 16 is adapted to receive a retainer element for holding the stem 12 and the mounted caster in the mounting structure against inadvertent displacement, as when the mounting structure 13 might be elevated, thereby raising the caster above its supporting surface and which, in the absence of some retaining means, would drop out of the socket 14. The retainer element, as herein disclosed, is inserted in the socket 14 with the stem 12 under pressure so that the retainer is compressed to some extent and holds the stem in the socket by frictional contact of the retainer with the interior walls of the mounting socket.

The present retainer comprises a plastic grip ring 20 which is seated in the annular recess 16 on the caster stem 12 and which is molded from an acetal resin which affords a retainer, as disclosed, that can be compressed so that in place it is under pressure and while it frictionally engages the inner walls of the mounting socket 14 the characteristics of the grip ring are such that it can be withdrawn from the mounting socket without undue difficulty and can readily be inserted into the socket under pressure without excessive stress. The design contours of the grip ring are such that these operations are facilitated. When the grip ring 20 is installed on the stem 12 mounted in the annular recess 16 the clearance between the top and bottom surfaces of the ring and the underside of the head 17 and the shoulder defining the lower side of the recess, is relatively small something on the order of approximately 1/64inch, or in a suitable range thereabout.

Before assembling the grip ring on the stem 12, mounted in the annular recess 16, the grip ring 20 comprises an integral fully circular complete ring, as best indicated in FIG. 2, but in place on the caster stem the grip ring comprises a split ring, as best indicated at 21. This conversion of the integral circular ring into a split ring is obtained by means of an internal notch 22 provided in the inner surface of the ring. As shown in FIGS. 2 and 3 the notch 22 is disposed at the inner side of the circular ring and extends substantially from top to bottom of the ring and through a substantial portion of the thickness of the ring. The notch is V-shaped and the walls of the notch are at (90°) or at right angles to each other.

The internal diameter of the grip ring 20 is somewhat bell-shaped, as best shown in FIG. 3, where it will be seen that the upper portion of the grip ring forms a collar 23 having an inner cylindrical surface adapted to be disposed around the stem 12 within the recess 16. Beneath the collar 23 the internal diameter of the ring flares, as at 24, and merges with an internal lower diameter 25 forming the bottom mouth of the grip ring. This bell shaped mouth facilitates mounting the grip ring 20 over the head 17 of the caster stem 12. As best shown in FIG. 4, the grip ring 20 is placed on the head 17 of the caster stem 12 with the bell shaped mouth of the ring disposed over the rounded head portion 18 so that upon pressing the ring 20 downwardly over the head 17 the ring splits as indicated at 26 in this Figure where the split is shown as just starting, but which upon pressing the ring downwardly over the head into the recess 16, splits upwardly for the full height of the grip ring.

The splitting of the ring 20 occurs as the ring is passed downwardly over the head of the caster stem to reach the annular recess 16. FIG. 4 illustrates more or less diagramatically, one manner of pressing the ring over the head of the stem which involves placing the grip ring 20 concentrically on the rounded head 18 of the caster stem and then applying sufficient pressure to cause the ring to pass over the head, splitting in the process, as at 26, so that the split ring can then enter into the recess 16 as it retracts upon passing the cylindrical portion 19 of the head 17 as indicated in FIG. 5. A tool 27 is shown for pressing the ring 20 down over the head of the stem and which includes a central core 28 surrounding by a pressing rim 29. The central core 28 is placed in contact with the head 17 of the stem and the rim 29 is in engagement with the upper surface of the grip ring 20. Upon downwardly pressure by the rim 29 the grip ring 20 is forced over the head of the stem, splitting the ring and then when the grip ring passes beyond the head 17 the ring retracts into the annular recess 16, as shown in FIG. 5.

The outer surfaces of the grip ring 20 are designed to facilitate insertion of the ring assembled on the stem 12 into the mounting socket 14 and to engage the inner walls of the socket concentrically. The outer surface of the grip ring is tapered, as shown in FIGS. 3, 4 and 5, from a point adjoining an outer cylindrical surface 30 upwardly to the top of ring as at 31. As shown in FIG. 5, this tapered outer surface 31 enables the grip ring 20, mounted on the stem 12, readily to enter the opening leading to the mounting socket 14 and this is possible without the necessity for chamfering the entrance of the socket to permit the entry. By this means the caster assembly can be mounted in the socket 14 by hand merely by pushing the stem into the socket. The ring 20 compresses as the tapered surface 31 rides into the opening and the cylindrical surface 30 then engages the inner walls of the mounting socket to hold the stem in place. The lower outer surface 32 of the grip ring tapers inwardly from the cylindrical surface 30 to the bottom edge of the ring where it seats on the bottom shoulder of the annular recess 16— as shown in FIG. 6, where the caster stem assembly is illustrated as fully entered into the mounting socket 14.

Entry of the grip ring 20 on the stem 12 into the mounting structure, is facilitated by a slight chamfer of the entering opening at the bottom of the socket, or hole 14, as at 33. Ordinarily, it has been the practice to provide a substantial chamfer at this point with previous designs but the plastic grip ring of this invention eliminates the need for such large chamfers while easing the insertion of the caster stem into the mounting. The chamfer 33 may be in the range of approximately 1/32 inch.

The grip ring 20 being of a suitable plastic material avoids any development of corrosion in the mounting regardless of the length of time the mounting may exist and because the ring 20 is plastic it enables the practice of splitting the ring on assembly without elaborate machinery and makes for an efficient, economical manufacture and application of the device in practice. Further, the design is such, involving the continuous ring as initially made that manufacturing tolerances are very small and dimensions can be held to minimums. The plastic material of the grip ring contributes to the successful improvements and advances in all of these areas.

From the foregoing it will be seen that there has been provided a caster assembly wherein the stem of the caster is provided with a grip ring made from an actual resin mounted in an annular recess on the stem by pressing the integral ring over a rounded head of the stem thereby splitting the ring which retracts into the recess and is shaped externally for ready entry into a mounting socket where the grip ring frictionally engages the socket walls to retain the caster assembly in operative relation with respect to a supported structure.

What is claimed is:

1. A non-metallic grip ring for a caster assembly including a caster stem and a caster mounting socket, said grip ring comprising an annular member mounted between said stem and said socket and having an outer bearing surface of some vertical extent located more closely adjacent to the bottom of the member than the top, said annular member having a tapered perimeter diminishing upwardly from a maximum diameter at said outer bearing surface to a minimum diameter at the top of the member, said outer bearing surface engaging the inner wall in said mounting socket, a cylindrical inner collar adjacent the top of said annular member having an inner bearing surface mounted about said stem, a cylindrical opening adjacent the bottom of the annular member of larger internal diameter than that of said inner bearing at the top collar, a bell-shaped internal surface merging with the internal surface of said cylindrical opening connecting the opening with the annular internal surface of said cylindrical bearing collar, and an interior notch extending vertically of said internal surfaces of the annular member defining a break area in the annular member to provide a split ring on the caster stem.

2. A non-metallic grip ring for a caster assembly as set forth in claim 1 wherein said annular member is molded from a plastic material such as an acetal resin.

3. A non-metallic grip ring for a caster assembly as set forth in claim 2 wherein said stem has an enlarged head and an annular recess below the head with said ring mounted in said recess, and said notch providing a break area to split said ring over said enlarged head.

4. A non-metallic grip ring for a caster assembly as set forth in claim 3 wherein the perimeter of said annular member engages the interior of said socket, and said converging inner surface is bell-shaped and provides clearance around the stem for compression of the member confined in the socket.

5. A non-metallic grip ring for a caster assembly as set forth in claim 3 wherein said notch is V-shaped with the walls thereof disposed substantially at 90°, said notch being of a depth extending substantially into the thickness of said ring.

6. In a non-metallic grip ring for a caster assembly as set forth in claim 2 wherein said stem has a rounded head and said grip ring comprises a fully circular integral ring, converting the integral ring to a split ring by placing the ring on said rounded head, pressing the ring over the head to split the ring at said notch, and retracting the split ring into said annular recess.

* * * * *